United States Patent [19]

Inoue

[11] 4,109,266
[45] Aug. 22, 1978

[54] BRAKING MECHANISM FOR FOCAL PLANE SHUTTERS

[75] Inventor: Nobuyoshi Inoue, Kawagoe, Japan

[73] Assignee: Copal Company Limited, Japan

[21] Appl. No.: 788,657

[22] Filed: Apr. 18, 1977

[30] Foreign Application Priority Data

Apr. 19, 1976 [JP] Japan .............................. 51-49110[U]

[51] Int. Cl.² .......................... G03B 9/40; G03B 9/08
[52] U.S. Cl. .................................... 354/246; 354/252
[58] Field of Search .............. 354/226, 247, 249, 250, 354/261, 252, 248, 241, 245, 246, 243, 253, 251

[56] References Cited

U.S. PATENT DOCUMENTS

| | | | |
|---|---|---|---|
| 2,928,326 | 3/1960 | Loose et al. | 354/243 |
| 3,871,012 | 3/1975 | Haraguchi | 354/246 |
| 3,886,572 | 5/1975 | Onda et al. | 354/252 |
| 3,946,413 | 3/1976 | Onda et al. | 354/252 X |

Primary Examiner—Donald A. Griffin
Attorney, Agent, or Firm—Cushman, Darby & Cushman

[57] ABSTRACT

A braking mechanism for focal plane shutters provided with a brake operating member pivoted in the tip portion of a shutter blade actuating member so as not to be freely movable and capable of taking an operating position and a non-operating position, a brake wheel supported rotatably with a proper resistance force on a shutter base plate and engageable with the brake operating member slightly before the end of the operation of the shutter blade actuating member and a stopper set on the shutter base plate and engageable with the shutter blade actuating member to stop the shutter blade actuating member so that a braking force may be efficiently applied to the shutter blade actuating member during a slight motion just before the end of the operation of said actuating member and then the braking means may not act as a load when said actuating member is stopped and the shutter is cocked.

6 Claims, 7 Drawing Figures

BRAKING MECHANISM FOR FOCAL PLANE SHUTTERS

BACKGROUND OF THE INVENTION (a) Field of the Invention

The present invention relates to braking means and more particularly to improvements in a braking mechanism adapted to focal plane shutters.

(b) Description of the Prior Art

Generally, in a photographic shutter, shutter blades are stopped instantaneously after moving at a very high speed. Therefore, if the shutter blades and their actuating members are stopped by making them collide with a fixed stopper or the like, respective parts of the mechanism will be vibrated with a loud impact sound by the shock of the collision to cause a camera-shake, the actuating part will bound, the shutter blades will flex to cause a faulty exposure and the durability of the shutter will reduce as pointed out in various shutters and particularly in so-called metallic focal plane shutters having metallic shutter blades.

There has been already made a shutter in which a brake mechanism braking shutter blade or their actuating members is incorporated to remedy the above mentioned defects. It is of a system of applying a friction brake to the shutter blades and their actuating member before they reach stopping positions. However, as the friction force is so made as to act on the actuating mechanism at the beginning even in the case of cocking the shutter, the load for cocking will be large and will greatly fluctuate at the beginning and end of cocking as disadvantages.

SUMMARY OF THE INVENTION

Therefore, an object of the present invention is to provide a shutter provided with a braking mechanism which will brake a shutter blade actuating member only just before the end of the operation of said actuating member in the case of a blade opening and closing motion by the shutter and will apply no load by the brake to the actuating means when the shutter is cocked.

According to the present invention, this object is attained by providing a brake operating member easily immovably pivoted on a shutter blade actuating member and capable of taking an operating position and non-operating position and a brake wheel mounted rotatably with a proper resistance force on a shutter base plate so that the brake operating member may be engaged with the brake wheel slightly before the end of the operation of the shutter blade actuating member and then the blade actuating member may be made to collide with a fixed stopper.

According to a preferred embodiment of the present invention, the stopper and brake wheel are arranged concentrically with each other and a plate spring is interposed between the brake wheel and shutter base plate.

According to another embodiment of the present invention, the stopper and brake wheel are arranged respectively in different positions.

This and other objects of the present invention will become more apparent during the course of the following detailed description and appended claims.

DESCRIPTION OF THE PREFERRED EMBODIMENTS

In the embodiments, only front blades of focal plane shutters and members related directly with said front blades are shown. All the mechanism parts related with them but not related with the present invention can be made clear by referring, for example, to the specification of U.S. patent Ser. No. 501,617 filed on Aug. 29, 1974 now U.S. Pat. No. 4,024,555 issued May 17, 1977.

Figure 1:
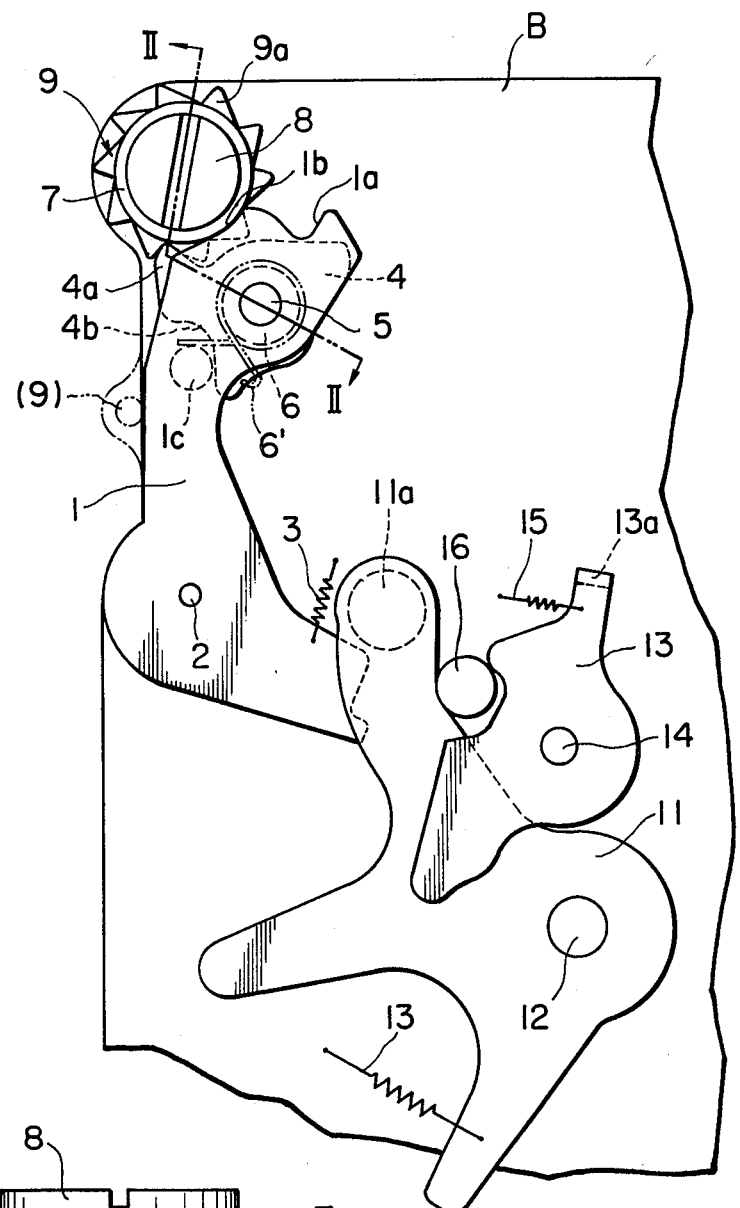
FIG. 1 is a plan view of an essential part of a shutter in which a braking mechanism according to the present invention is incorporated as uncocked.
Figure 2:
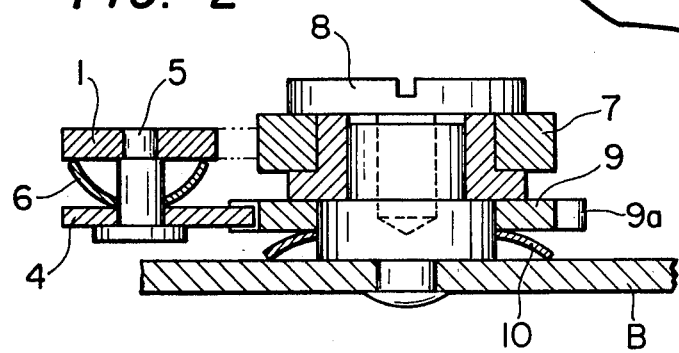
FIG. 2 is a sectioned view on line II—II in FIG. 1.
Figure 3:
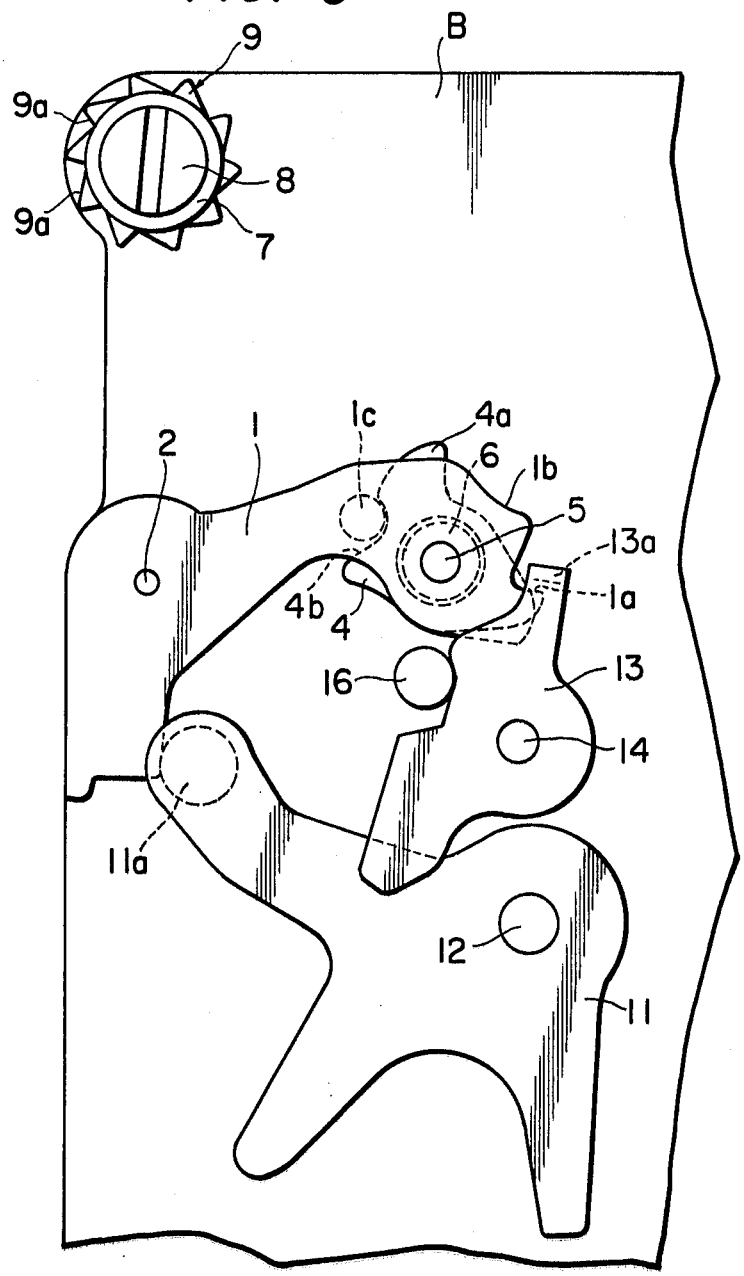
FIG. 3 is the same plan view as FIG. 1, showing a cocking lever as rotated to its extreme position.

Reference numeral 1 indicates a front blade actuating lever supported rotatably by a shaft 2 on a shutter base plate B and biased counterclockwise by a spring 3. A hook portion 1a and an arcuate surface 1b are formed in the tip portion of the front blade actuating lever 1. Numeral 4 indicates a brake operating member supported rotatably by a shaft 5 below the tip portion of the front blade actuating lever 1 and having a pawl portion 4a and a side 4b engageable with a pin 1c erected on the front blade actuating lever 1. As clearly shown in FIG. 2, a dish-shaped plate spring 6 is interposed between the actuating lever 1 and brake operating member 4 so that the brake operating member 4 may not rotate freely during the operation of the front blade actuating lever 1. Therefore, the brake operating member 4 can take the operating position shown in FIG. 1 and the non-operating position shown in FIG. 3. Numeral 7 indicates a disk-shaped stopper mounted on a shaft 8 erected on the base plate B and made of a synthetic resin material which can absorb impacts. Numeral 9 indicates a brake wheel mounted rotatably on the shaft 8 below the stopper 7 and formed, in this embodiment, as a ratchet wheel having ratchet teeth 9a. As shown in FIG. 2, a dish-shaped plate spring 10 of a proper strength loosely fitted to the shaft 8 is interposed between the brake wheel 9 and shutter base plate B. Therefore, the brake wheel 9 can not freely rotate but will be able to rotate only when a predetermined torque is applied. The stopper 7 is located in such position that, when the front blade actuating lever 1 has rotated by a predetermined range, it will collide with the arcuate surface 1b. Further, the pawl portion 4a is so arranged as to engage with the ratchet tooth 9a slightly before the arcuate surface 1b collides with the stopper 7.

Reference numeral 11 indicates a cocking lever mounted rotatably on a shaft 12 erected on the base plate B, biased clockwise by a spring 13 and having a pin 11a engageable with the end portion of the front blade actuating lever 1. Numeral 13 indicates a locking lever for locking the front blade actuating lever 1 located in the cocked position with a bent portion 13a, mounted rotatably on shaft 14 erected on the base plate B and biased counterclockwise by a spring 15. Numeral 16 indicates a fixed pin on the base plate B, regulating the clockwise rotating position of the cocking lever 11 and the counterclockwise rotating position of the locking lever 13.

The operation of the above mentioned device shall be explained in the following. When the cocking lever 11 is rotated counterclockwise against the spring from the position in FIG. 1, being pushed by the pin 11a, the front blade actuating lever 1 will be rotated clockwise against the spring 3.

In the initial period of this clockwise rotation, the pawl portion 4a of the brake operating member 4 will move while being guided by the teeth 9a of the brake wheel 9 and therefore the brake operating member 4 will rotate counterclockwise against the rotary friction force until it is stopped by the pin 1c and will separate from the brake wheel 9. A little before the cocking lever 11 reaches the maximum counterclockwise rotated position, the hook portion 1a of the front blade actuating lever 1 will contact the bent portion 13a of the locking lever 13 and will clockwise rotate the locking lever 13. In the position in FIG. 3 in which the cocking operation is completed, the locking lever 13 is counterclockwise rotated in the position in which it is stopped with the pin 16 by the spring 15.

Figure 4:
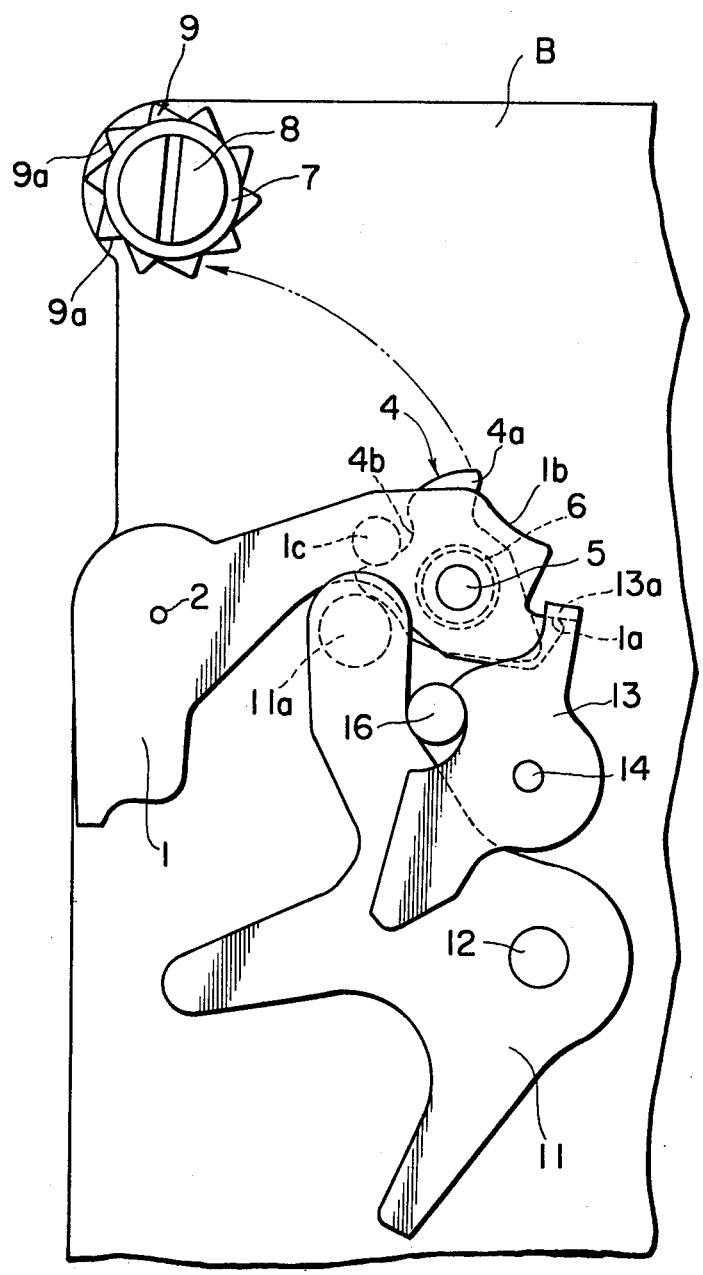
FIG. 4 is the same plan view as FIG. 1 as cocked.

When the cocking lever 11 is released, it will be rotated clockwise by the returning force of the spring 13, the front blade actuating lever 1 will be rotated slightly counterclockwise by the returning force of the spring 3 and will be locked by the bent portion 13a of the locking lever 13 and the brake operating member 4 or the front blade actuating lever 1 will be rotated slightly clockwise by the pin 11a until it is prevented by the pin 1c in the returning stroke of the cocking lever 11 (FIG. 4).

When the locking lever 13 is rotated clockwise by the releasing operation from this state and is unlocked from the bent portion 13a, the front blade actuating lever 1 will be quickly rotated counterclockwise by the returning force of the spring 3 to run a front blade group not illustrated. Near the end of this counterclockwise rotation, the pawl portion 4a of the brake operating member 4 will collide with one of the teeth 9a of the brake wheel 9 as indicated by the arrow of the two-point chain line in FIG. 4 and the brake wheel 9 will be rotated against the rotary friction force between it and the base plate B. After the brake wheel 9 thus rotates clockwise by substantially one tooth and the counterclockwise rotating speed of the front blade actuating lever 1 reduces, the arcuate surface 1b of the front blade actuating lever 1 will slowly collide with the peripheral wall of the stopper 7 and will stop (FIG. 1). That is to say, just after the front blade group not illustrated passes on an exposure aperture not illustrated formed in the base plate B at a speed determined by the returning force of the spring 3, the brake operating member 4 will collide with the tooth 9a of the wheel 9, a braking force will act against the direction indicated by the arrow in FIG. 4 due to the rotary friction force between the brake wheel 9 and base plate B and the rotating speed will quickly reduce. When the brake wheel 9 rotates by substantially one tooth, the arcuate surface 1b of the front blade actuating lever 1 will contact the stopper 7, therefore the moving energy of the front blade actuating lever 1 will be ingeniously absorbed by the multiplied action of two different means and the shock on the shutter blades and their actuating member by stopping will be minimized. Further, as the brake wheel 9 is rotated until the front blade actuating lever 1 collides with the stopper 7, the rotation by one tooth in each shutter release will be secured.

Figure 5:
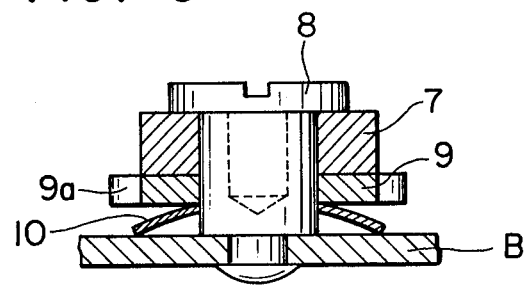
FIGS. 5, 6 and 7 are the same sectioned views as FIG. 2, respectively showing different structure examples of a brake wheel and stopper.
Figure 6:
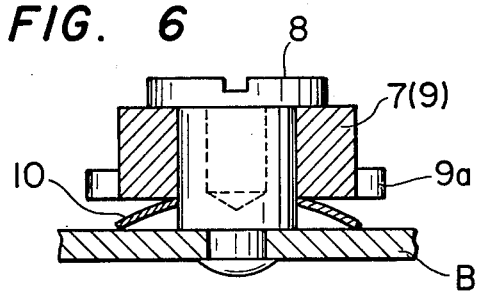
Figure 7:
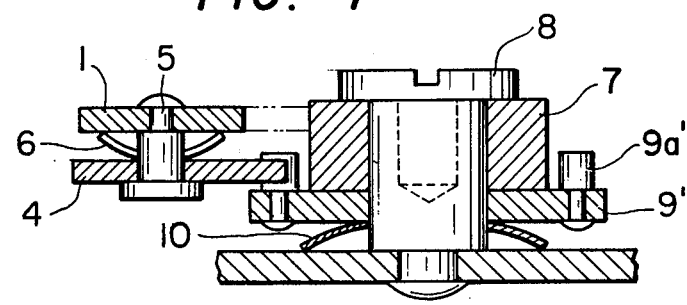

In the above described embodiment, the stopper 7 and brake wheel 9 are formed as respectively separate bodies. However, they may be formed integrally as shown in FIG. 5 or may be shaped to be integral of the same material as shown in FIG. 6. Further, as different from the above mentioned embodiment, the brake wheel 9 may be formed as a pin wheel 9' having a plurality of pins 9a' as shown in FIG. 7. The stopper 7 may be arranged in a position different from that of the brake wheel 9 as shown by the chain line in FIG. 1. The brake operating member 4 may be biased clockwise by using a spring 6' as shown by the chain line in FIG. 1 instead of the dish-shaped spring 6 so that the brake operating member 4 may not freely move. Further, the stopper 8 may be provided in a position different from the brake wheel 9 as shown by the chain line in FIG. 1.

I claim:

1. A braking mechanism for focal plane shutters comprising a shutter base plate, a shutter blade actuating member supported rotatably on said base plate to run shutter blades, a brake operating member supported rotatably on said blade actuating member and capable of taking its operating position and its non-operating position, a brake wheel supported rotatably with a friction on said base plate and having thereon a plurality of engaging portions engageable with said brake operating member, and a stopper provided on said base plate to end the operation of said shutter blade actuating member, said brake operating member being engaged with said brake wheel to apply a braking force to said shutter blade actuating member a little before said shutter blade actuating member collides with said stopper.

2. A braking mechanism for focal plane shutters according to claim 1 wherein a dish-shaped plate spring is interposed between said base plate and said brake wheel.

3. A braking mechanism for focal plane shutters according to claim 1 wherein said stopper and said brake wheel are arranged concentrically with each other.

4. A braking mechanism for focal plane shutters according to claim 1 wherein said stopper and said brake wheel are arranged respectively in different positions.

5. A braking mechanism for focal plane shutters according to claim 1 wherein a dish-shaped plate spring is interposed between said brake operating member and said shutter blade actuating member.

6. A braking mechanism for focal plane shutters according to claim 1 wherein a spring biasing said brake operating member in one direction is connected between said brake operating member and said shutter blade actuating member.

* * * * *